Patented May 10, 1932

1,857,357

UNITED STATES PATENT OFFICE

OSCAR A. CHERRY AND FRANZ KURATH, OF CHICAGO, ILLINOIS, ASSIGNORS TO ECONOMY FUSE & MANUFACTURING COMPANY, OF CHICAGO, ILLINOIS, A CORPORATION OF NEW YORK

POTENTIALLY REACTIVE PHENOLIC CONDENSATION PRODUCTS AND PROCESS OF PREPARING SAME

No Drawing. Application filed April 9, 1928. Serial No. 268,795.

This invention relates to quick hardening, potentially reactive phenolic condensation products, and to methods of obtaining them, and more particularly to potentially reactive condensation products characterized by containing in some proportion the reaction product of furfural on a phenolic body.

Heretofore there have been no known methods for producing quick hardening potentially reactive condensation products for hot molding operations which contain the reaction products of furfural on phenol. In order to successfully produce a quick hardening molding composition it is necessary to have both a quick reaction between the first reaction product and the hardening agent, as regards rapidity with which the constituents combine and also one which is not unduly long by virtue of the presence of a large amount of phenol to be combined with.

Certain prior disclosures teach that the amount of furfural reacted with phenol may be varied under certain conditions.

The preparation of a fusible furfural-phenol resin was taught by Beckman and Dehn (Sitzb. Kgl. preuss. Akad. Wiss. 1918) by a method which makes use of an acid catalyst and which accordingly involves using a large excess of phenol. To make a potentially reactive product therefrom involves the use of a large quantity of hexa-methylene-tetramine. This is disadvantageous inasmuch as hexa-methylene-tetramine is relatively expensive and the presence of such a quantity of uncombined phenol makes the products slow hardening under the action of heat or the combined action of heat and pressure.

By the use of a basic condensing agent to effect the combination of furfural and phenol a larger proportion of furfural may be employed and the excess of uncombined phenol correspondingly reduced, but this product after being rendered potentially reactive by the addition of hexa-methylene-tetramine is also slow hardening. Furthermore, when hot molding compositions adapted to harden under the combined action of heat and pressure are made therefrom by the addition of suitable fillers, such compositions exhibit a marked tendency to stick to the mold, to produce blistered objects, and the molded objects made therefrom lack the extremely high mechanical strength possessed by objects made from phenol-formaldehyde potentially reactive products.

The same objections apply to fusible resins made from furfural or other aldehydes containing two or more carbon atoms.

It has been found that the reaction product of furfural and phenol combines quite slowly with methylene groups in the hardening process and that the reaction is progressively slower as the amount of furfural reacted with phenol is increased. It is also found that although substances are selected which combine rapidly, as for instance, the reaction product of phenol and formaldehyde and additional methylene groups, that where there is a large amount of uncombined phenol to be reacted with methylene groups the hardening operation is slow because of the prolonged action between the methylene groups and the large amount of phenol. This results in two alternative conditions, both of which are unfavorable to quick hardening actions where furfural is reacted with phenol, in that if a large amount of furfural is employed in order to correspondingly reduce the amount of phenol remaining uncombined in the initial product a reaction product of furfural and phenol is formed which reacts with methylene groups so slowly that the product is not suitable for quick hardening hot molding compositions. On the other hand, if the amount of furfural is correspondingly reduced to offset this action, then the amount of uncombined phenol is so great that irrespective of the fact that the reaction product of furfural and phenol is one which reacts more rapidly with methylene groups employed in the hardening process, the length of time necessary to effect the reaction between the uncombined phenol and the methylence groups is so great that the product is rendered unsuitable for quick hardening hot molding compositions.

Accordingly, the present invention proceeds upon the principle of providing a potentially reactive product which is free from these objections and is one which employs, in part at least, in the initial reaction, the reaction product of furfural and phenol. More particularly, the invention contemplates the formation of a potentially reactive product suitable for quick hardening hot molding operations comprising a reaction product having both furfural and methylene groups combined with phenol together with additional methylene groups present either in the initial product or subsequently added, for reacting with the uncombined phenol in the final hardening operation.

It is well known that one-step reactions for making potentially reactive products are subject to certain objections particularly that of disposing of the water present when methylene containing substances in solution are employed in place of the anhydrous methylene containing substances, because when the water is discarded the additional methylene groups present for the purpose of hardening the initial product are held in the aqueous layer and are discarded therewith unless some novel method is employed to prevent this loss. As an alternative the water may be boiled off without loss of the methylene groups provided the temperature is kept low, such as boiling under reduced pressure, but this method is also undesirable because the heat treatment is very apt to convert the condensation product into a worthless rubbery mass. To avoid the objections of the one-step process, the two-step process is often resorted to, but here again certain objections are encountered. The water, of course, can be eliminated without difficulty as the hardening agent present for reacting with the excess phenol is introduced after the water has been discarded. This makes it necessary, however, in hot molding compositions to employ only anhydrous hardening agents.

It is also old in the art to produce permanently fusible reaction products by reacting phenol and furfural, or by reacting phenol and a methylene containing substance, such as formaldehyde, and after eliminating the water present to add a hardening agent, such as a methylene containing substance in an anhydrous form for rendering the permanently fusible product potentially reactive and capable of being converted by further heat treatment into an insoluble and infusible resin. This form of two-step reaction necessitates the use of anhydrous hardening agents. The only anhydrous hardening agents known for this use are para-formaldehyde and hexa-methylene-tetramine. Para-formaldehyde is objectionable and cannot be used in commercial hot molding compositions on account of its extremely offensive odor, and its tendency to cause blistering during the molding operation. Hexa-methylene-tetramine is also objectionable in that it reacts only very slowly in the hardening process and is limited to use with phenol, meta-cresol, or mixtures of phenol or meta-cresol with other phenols, which mixtures contain a preponderating proportion of phenol or meta-cresol and also in that its presence results in the formation of ammonia gas which blisters, forming objectional imperfections in the articles cast.

It has also been proposed to react successively upon phenol with acetaldehyde and furfural to form a fusible resinous product, which may be rendered potentially reactive by the addition of hexa-methylene-tetramine.

There are several limitations and well-known objections to the above described known processes and the potentially reactive products formed thereby are found to suffer from serious defects.

Accordingly, the present invention contemplates a process in which furfural is caused to react with a phenolic body which may in certain aspects of the invention be cheap mixtures of phenols, heretofore unuseable in combination with furfural to produce commercial hot molding compositions of the thermosetting type. The product so obtained, which may be either a rather thin liquid, or viscous mass, depending upon the amount of furfural employed to react on the phenolic substance being used, is caused to react further with formaldehyde to form therewith a substance which may be termed a potentially reactive product, or a partial reaction product. This invention may be practiced by either a one-step or a two-step reaction. If two-step reactions are employed, the disadvantages of using anhydrous hardening agents will be present, but the applicant does not wish to be limited in this regard, inasmuch as the important feature of this invention is reacting furfural on a phenolic body and subsequently reacting the reaction product thereof and excess phenol with a methlene containing substance to form an initial or partial reaction product.

By employing the one-step process, the hardening agent may be introduced initially, which accordingly eliminates the necessity of employing anhydrous hardening agents. As is well known, the water formed may be discarded without the loss of the hardening agent, by distilling the product under reduced pressure, great care being taken not to convert the resinous product into a worthless rubbery mass by such heat treatment.

Although the above one-step and two-step methods are within the scope of this invention, the preferable method of producing the products herein referred to is by a one-step process in which the hardening agent, such as a methylene containing substance is fixed in the resinous layer by the introduction of furfuramide, permitting the water to be eliminated without heat treatment and without the loss of the hardening agent. This step is more particularly the subject matter of, and is broadly claimed, in the co-pending application of Franz Kurath, Serial No. 89,438, filed February 19, 1926, which has matured into Patent 1,726,671, and is not claimed herein except insofar as it relates specifically to this process.

The resultant of this process is a potentially reactive phenolic condensation product which is adapted to be used for many of the purposes to which this type of product is ordinarily put. It is particularly adapted for use in preparing hot molding compositions adapted to harden under the combined action of heat and pressure.

As examples of the ways in which the invention may be carried out the following descriptions will be given. It is to be understood that they are to be considered as merely illustrative and not as limiting the invention in any sense.

In a flask equipped with a return condenser 188 parts by weight of phenol, 20 parts by weight of water, 4 parts by weight of caustic soda and 32 parts by weight of fulfural are boiled for approximately three hours. Then 6.3 parts by weight of oxalic acid are added to neutralize the caustic soda. After neutralization and preferably some cooling, 150 parts by weight of commercial formaldehyde solution are added. Then 24 parts by ammonia (26° Bé.) are added and the whole is heated to boiling. At this stage the reaction is extremely exothermic and cooling is desirable if the quantity of reactants is large. After some time the reaction subsides and heating may be employed to maintain ebullition. After about fifty minutes heating may be discontinued and after slight cooling 10 parts by weight of furfuramide are stirred into the mixture. The formaldehyde odor of the mixture disappears and the supernatant water may be mechanically separated without loss of formaldehyde. After separation of the water, the resinous product may be mixed with wood flour, preferably an approximately equal quantity by weight, or other filling materials, dyes, pigments, etc., by methods well known in the art, to form compositions well adapted for use in commercial hot molding operations. The compositions so formed flow well in the mold, harden rapidly and articles formed therefrom are mechanically, chemically and electrically resistant. In contradistinction to products made from the products of the reaction of fulfural and phenol in the presence of an acid, molding objects of light colors such as red, brown and yellow, may be made from these compositions by the use of suitable pigments and dyestuffs.

As another illustration the use of a commercial mixture of phenols comprising relatively small amounts of meta and para cresols and relatively larger amounts of the isomeric zylenols and higher boiling phenols together with traces of organic bases and relatively inert hydrocarbons will be described. Such a mixture is known on the market as cresylic acid and so far as we are aware has not been previously utilizable in conjunction with furfural and formaldehyde for the production of commercial potentially reactive compositions adapted to commercial hot molding.

In a flask equipped with a return condenser, 200 parts by weight of cresylic acid, 30 parts by weight of furfural and 40 parts by weight of 10% caustic soda solution are heated to boiling for about three hours. Then 5 parts by weight of oxalic acid are added to partially neutralize the caustic soda. After partial neutralization 150 parts by weight of commercial formaldehyde solution are added and the whole is heated to boiling. An exothermic reaction occurs which may necessitate cooling if the quantity of reactants is large. After the exothermic reaction has subsided heat should be applied to maintain ebullition for about one hour. The mixture so obtained comprises a supernatant layer containing uncombined formaldehyde. Furfuramide is added to the mixture in sufficient quantity to remove the odor of formaldehyde and the supernatant water is mechanically separated. The quantity of furfuramide usually desirable is about thirty parts by weight, but it may be increased in amount without deleterious effects. The product so obtained has the characteristics necessary for potentially reactive products for use in commercial induratable hot molding compositions.

As a further example 200 parts by weight of cresylic acid, 100 parts by weight of furfural and 40 parts by weight of 10% caustic soda solution are boiled under a reflux condenser for 4 hours. To the product are added 100 parts by weight of formaldehyde solution and the whole is heated to boiling. The reaction is exothermic and depending on the quantity of reactants, cooling may be desirable. Ebullition is maintained for approximately 10 minutes and a quantity of furfuramide sufficient to remove the formaldehyde odor of the product is added. About 25 parts by weight of furfuramide are usually sufficient. An emulsion is usually formed in this case and it is difficult to separate the water therefrom. However, this step is not necessary.

The emulsion so formed may be mixed with fillers by means of mixing machines which are commonly employed in the art and the mixing may be accomplished without the addition of solvents. After admixture of condensation product and filler the water present may be removed by drying in air or in vacuo. After drying the composition is suitable for use in hot molding operations.

The proportions of the various constituents may be varied widely. Instead of using pure phenol or cresylic acid mixtures of these phenols may be used. Instead of caustic soda, other well known condensing agents may be employed to facilitate the reaction between the furfural and phenolic body.

The proportion of furfural may be reduced or increased somewhat over the proportions given. It is essential if quick curing products under commercial conditions are to be obtained that the proportion of furfural be kept sufficiently low that a substantial quantity of reactive methylene group containing substance may be reacted with the initial product without producing an infusible product.

In general as the proportion of furfural is increased the reactivity of the final product is decreased. This objection to the use of the larger amounts of furfural is to some extent counterbalanced by the advantage that those products containing larger amounts of furfural reaction products may be carried to an extremely advanced stage of condensation and still flow well in the mold.

An especial advantage of products made by the above described method from cresylic acid is that although they harden rapidly under the temperatures employed in hot molding operations they harden quite slowly at low temperatures, as for example 50–60° C. For this reason if some variation has been introduced into the process so that products which are in a too incomplete state of condensation for rapid hardening at commercial hot molding temperatures are obtained the products may be brought to the correct state without danger of spoilage. The hot molding compositions made from such insufficiently reacted products may be heated at 50–60° C. until they are found to harden sufficiently rapidly for commercial purposes. The rate of reaction at such temperatures is so slow that samples may be taken and tested from time to time in order that compositions having the exact properties desired are obtained. It is possible to withdraw a sample and test it before sufficient further reaction to invalidate the test has occurred.

Another advantage of these products is that they exhibit no tendency to blister during the molding operation.

One aspect of the process has been described which utilizes cresylic acid. Cresylic acid is a commercial mixture of phenols and samples of cresylic acid from different sources having frequently different chemical properties. So in the processes employing cresylic acids, variations may be necessary as the cresylic acids vary. Variations in the cresylic acids are usually compensated for by longer or shorter reaction periods, both when the furfural is being reacted and when the reactive methylene group containing substance is reacted with the initial product.

Additional methods of practicing this invention are as follows:

To 188 parts of phenol liquefied by the addition of 21 parts of water are added 20 parts of furfural and 5 parts of concentrated (37%) hydrochloric acid and the solution is allowed to stand 1½ hours without external heating. A black coloration is produced by the addition of the acid and at the end of the time specified, a black liquid is obtained.

The hydrochloric acid present is then neutralized by the addition of an equivalent amount of caustic soda or other base and 160 parts of formaldehyde solution (37%) and 24 parts of ammonia (26° Bé.) are added. The mixture is heated to boiling under a return condenser. At this stage the reaction is exothermic and cooling may be desirable if the quantity of reactants is large. After the violence of the reaction has diminished heat may be applied to maintain ebullition. After about one hour's heating the mixture is allowed to cool somewhat and sufficient furfuramide or an equivalent substance is stirred into the mixture to eliminate the odor of formaldehyde from the mixture. About 10 parts of furfuramide are usually sufficient. The supernatant water may now be decanted without loss of formaldehyde and a potentially reactive product is thereby obtained which is admirably suited for the production of molded objects after admixture with suitable fillers. The articles produced from this resin and wood flour without the use of pigments or dyestuffs are of a light brown color.

Or 200 parts of cresylic acid, 20 parts of furfural and 5 parts of concentrated hydrochloric acid may be allowed to react as above described in the case of phenol. The acid is then neutralized by an equivalent amount of base and 1 part of caustic soda or other fixed base over and above that necessary for the neutralization of the acid is added. Then 150 parts of formaldehyde are added and reaction is caused by the application of heat as previously described for cresylic acid. After about one hour's heating furfuramide is added as previously described. About thirty parts of furfuramide are usually sufficient to eliminate the odor of formaldehyde from the mixture.

The resin so obtained is suitable for quick hot molding operations. Molded objects produced therefrom are darker in color than those produced from similar phenol resins.

As above pointed out, the present invention may be practiced by either a one-step or a two-step process, and in the appended claims, the applicant has endeavored to define his invention without limitation in this regard. In the claims, the term "partial reaction product" is used and it is to be understood that this term means a fusible potentially reactive resin or, in other words, one having uncombined reactive methylene groups present, irrespective of whether the methylene groups are already present as in the case of a one-step reaction or have been subsequently added as in the case of a two-step reaction.

We claim:

1. The process which consists in heat treating furfural and a phenolic body, and heat treating the resultant product with a quantity of a methylene containing substance sufficient to form a fusible reaction product by combining with the furfural-phenol product and phenol and to supply sufficient additional methylene groups to render the fusible reaction product potentially reactive, then adding furfuramide to fix the additional methylene groups in the resinous layer, and then discarding the water.

2. The process which consists in heating under a return condenser phenol and furfural in the presence of a base for approximately three hours, then neutralizing the solution and after cooling, heating the resultant product with commercial formaldehyde in the presence of ammonia, maintaining ebullition for approximately 50 minutes and then after cooling adding furfuramide and after stirring in the furfuramide until the odor of formaldehyde disappears, mechanically separating the supernatant water.

3. The process which consists in heating under a return condenser phenol and furfural in the presence of caustic soda for approximately three hours, then neutralizing the solution and after cooling, heating the resultant product with commercial formaldehyde in the presence of ammonia, maintaining ebullition for approximately 50 minutes and then after cooling adding furfuramide and after stirring in the furfuramide until the odor of formaldehyde disappears, mechanicaly separating the supernatant water.

4. The process which consists in heating under a return condenser phenol and furfural in the presence of a catalyst for approximately three hours, then neutralizing the solution and after cooling, heating the resultant product with commercial formaldehyde in the presence of ammonia, maintaining ebullition for approximately 50 minutes and then after cooling adding furfuramide and after stirring in the furfuramide until the odor of formaldehyde disappears, mechanically separating the supernatant water.

5. The process which consists in boiling under a return condenser, approximately 188 parts by weight of phenol, 120 parts by weight of water, 4 parts by weight of caustic soda and 32 parts by weight of furfural for approximately three hours, then adding to neutralize the caustic soda approximately 6.3 parts by weight of oxalic acid, cooling and heat treating the resultant product with approximately 150 parts by weight of commercial formaldehyde and 24 parts by weight of ammonia (26° Bé.), maintaining ebullition for approximately 50 minutes, permitting slight cooling, and then stirring in approximately 10 parts by weight of furfuramide, and when the odor of formaldehyde has disappeared from the mixture, mechanically separating the supernatant water.

6. The process which consists in reacting phenol and furfural in the presence of a catalyst, then neutralizing this solution and heat treating the resultant product with commercial formaldehyde in the presence of a condensing agent, continuing the heat treatment approximately fifty minutes and then after cooling, adding furfuramide and after stirring in the furfuramide until the odor of formaldehyde disappears, mechanically separting the supernatant water.

Signed at Chicago, Illinois, this 5th day of April, 1928.

OSCAR A. CHERRY.
FRANZ KURATH.